(12) United States Patent
Cooke

(10) Patent No.: US 8,469,006 B2
(45) Date of Patent: Jun. 25, 2013

(54) FUEL INJECTOR

(75) Inventor: Michael Peter Cooke, Gillingham (GB)

(73) Assignee: Delphi Technologies Holding S.arl, Luxembourg (LU)

( * ) Notice: Subject to any disclaimer, the term of this patent is extended or adjusted under 35 U.S.C. 154(b) by 618 days.

(21) Appl. No.: 12/227,278

(22) PCT Filed: May 11, 2007

(86) PCT No.: PCT/GB2007/001732
§ 371 (c)(1),
(2), (4) Date: Sep. 4, 2009

(87) PCT Pub. No.: WO2007/132199
PCT Pub. Date: Nov. 22, 2007

(65) Prior Publication Data
US 2010/0050991 A1    Mar. 4, 2010

(30) Foreign Application Priority Data

May 12, 2006   (GB) .................................. 0609519.4
Jun. 7, 2006   (EP) .................................... 06252936

(51) Int. Cl.
*F02M 51/00*   (2006.01)
*B05B 1/30*    (2006.01)
*G01L 23/22*   (2006.01)

(52) U.S. Cl.
USPC ..................... 123/478; 239/585.1; 73/35.12

(58) Field of Classification Search
USPC .............. 123/494, 498, 490, 478; 239/102.2, 239/585.1; 73/35.12, 35.13, 114.38, 114.43, 73/114.45, 114.51, 115, 119
See application file for complete search history.

(56) References Cited

U.S. PATENT DOCUMENTS

| | | | | |
|---|---|---|---|---|
| 2,067,131 A | * | 1/1937 | Schlaupitz | ..................... 239/86 |
| 2,172,556 A | * | 9/1939 | Edwards | ....................... 239/452 |
| 5,242,118 A | * | 9/1993 | Schmidt et al. | ............ 239/533.4 |
| 6,053,432 A | * | 4/2000 | Stevens | ....................... 239/533.2 |
| 6,192,870 B1 | * | 2/2001 | Lambeth | ....................... 123/510 |
| 6,622,549 B1 | * | 9/2003 | Wlodarczyk et al. | ...... 73/114.51 |
| 2007/0039592 A1 | | 2/2007 | Kull | |

FOREIGN PATENT DOCUMENTS

| | | |
|---|---|---|
| DE | 31 30 238 | 2/1983 |
| DE | 196 22 651 | 12/1996 |
| JP | 57-151519 | 9/1982 |
| JP | 59-56374 | 4/1984 |
| JP | 60-113126 | 6/1985 |
| JP | 62-53333 | 4/1987 |
| JP | 9-53483 | 2/1997 |
| JP | 10-111206 | 4/1998 |
| JP | 2006-64675 | 3/2006 |
| WO | 98/35210 | 8/1998 |
| WO | 2004/083623 | 9/2004 |
| WO | 2005/026530 | 3/2005 |

OTHER PUBLICATIONS

Japan Office Action dated Dec. 27, 2010.
International Search Report dated Aug. 20, 2007.

* cited by examiner

*Primary Examiner* — Stephen K Cronin
*Assistant Examiner* — Sherman Manley
(74) *Attorney, Agent, or Firm* — Thomas N. Twomey

(57) ABSTRACT

A fuel injector comprising an injector body, a capnut, and a pressure sensor exposed to pressure changes in a combustion chamber in use, wherein the pressure sensor is accommodated within the capnut. Optionally, the fuel injector further comprises a signal cable external to the injector body to connect with the pressure sensor.

30 Claims, 11 Drawing Sheets

FUEL INJECTOR

This invention relates to a fuel injector for use in internal combustion engines. In particular, the invention relates to a fuel injector having an integrated pressure sensor for determining the pressure in a combustion chamber of the engine.

During operation of an internal combustion engine, combustion of fuel occurs in one or more combustion chambers defined, in part, by associated cylinders provided in an engine cylinder block. The volume of each combustion chamber is determined by the position of a reciprocating piston, and gases are admitted to and exhausted from the combustion chamber by way of inlet and exhaust valves provided in a cylinder head. The pressure of gases within a combustion chamber at a given time is determined by, amongst other parameters, the position of the piston and the open or closed arrangement of the valves.

In a diesel (compression ignition) engine, fuel is admitted to the combustion chamber through a fuel injector. The timing of the fuel injection event and the quantity of fuel delivered with each injection are crucial to the smooth running and fuel efficiency of the engine. For example, the injection event should occur at a point in the compression cycle when the temperature of the gases in the combustion chamber is sufficient to cause spontaneous ignition and complete combustion of the fuel, and when the piston is suitably positioned to allow the maximum force to be transmitted from the combusting gases. Furthermore, the burning characteristics of the fuel, and the force available from combustion, depend on the pressure in the combustion chamber at injection.

In order to optimise combustion, it is known to measure the combustion chamber pressure during the combustion cycle. The output of such a measurement is fed into an engine control unit where it can be used, along with other parameters, to determine the optimum timing and duration of the fuel injection event. Combustion chamber pressure measurement is also desirable in petrol (spark ignition) engines, where the timing of fuel injection events and ignition sparks can be optimised if the combustion chamber pressure is known.

In both types of engine, measurement of the combustion chamber pressure can give useful diagnostic information, for example to indicate leakage of gases past the piston or valves.

In order to measure the combustion chamber pressure, a pressure sensor is required, and several arrangements of combustion chamber pressure sensors are known in the art.

In one example, a pressure sensor is mounted in a bore in the cylinder head. However, this arrangement is not always convenient because the cylinder head must accommodate a number of other components and there may not be sufficient space available in the cylinder head to accommodate the required bore.

In another arrangement, the chamber pressure sensor is integrated into a glow plug. For example, in U.S. Pat. No. 6,539,787 B1, the pressure in the combustion chamber is communicated mechanically to a pressure sensor by way of a sheath and a shaft. Although incorporating the pressure sensor within the glow plug removes the need for a separate bore in the cylinder head, this arrangement requires that wiring be provided between the glow plug and the fuel injection control unit, which would not otherwise be present. Of course, this arrangement cannot be used where glow plugs are not present, as is the case in petrol engines or, commonly, large diesel engines.

Another alternative arrangement is to provide a pressure sensor incorporated into a sealing washer or gasket, as described in Japanese Patent No. JP 9 049 483. In that case, a pressure sensor is located between a seating surface of a bore in the cylinder head of a petrol engine and a seating surface of a spark plug located in the bore. The pressure sensor detects the displacement of the spark plug relative to the cylinder head to give an indication of the combustion chamber pressure, which acts on the chamber-side face of the spark plug. This arrangement is disadvantageous because the pressure sensor can be damaged during assembly and maintenance of the engine components.

Against this background, it would be desirable to provide an alternative arrangement for a cylinder pressure sensor that alleviates or overcomes the abovementioned difficulties.

According to the present invention, there is provided a fuel injector comprising an injector body, a capnut, and a pressure sensor exposed to pressure changes in a combustion chamber, in use, wherein the pressure sensor is accommodated within the capnut.

Such an arrangement advantageously provides a pressure sensor integrated with a fuel injector, so that additional bores in the cylinder head, or other substantial modifications to conventional cylinder head designs, are not required. Furthermore, the pressure sensor can be provided without departing from preferred fuel injector designs, so that the components controlling the fuel delivery function need not be compromised by the presence of the pressure sensor. In addition, the signal connections to the pressure sensor may be routed from the injector to the same engine control unit as the electrical connections to the fuel delivery components of the fuel injector, thus simplifying the under-bonnet wiring in comparison to other arrangements.

A fuel injector with an integrated pressure sensor has been previously described in European Patent No. EP 1 015 855 B1, in which a fuel injector with an integrated fibre optic pressure sensor is contemplated. However, significant modifications to the basic injector design are required to accommodate the pressure sensor. A passage must be provided adjacent to the nozzle tip to allow communication between the pressure sensor and the combustion chamber. Furthermore, a bore must be provided through the injector body to accommodate the sensor and a fibre optic signal cable connecting with the sensor.

The presence of such bores and passages can weaken the structure of the injector, and such features are particularly unsuitable when an accumulator volume is provided within the injector, such as in the injector described in the Applicant's European Patent No. EP 0 995 901 B. Fuel at high pressure within the accumulator volume causes high stresses in the walls of the injector body. If bores or grooves were present in these highly-stressed walls, the risk of bursting would be greatly increased. Because of the dimensional constraints on the injector design due to the limited diameter of the bore in the cylinder head, the walls of the injector body cannot be thickened to accommodate a bore for the sensor or the signal cable.

In the present invention, the pressure sensor is provided in the capnut of the injector, outside the injector body. This means that substantially no modification to the basic design of the injector is required to accommodate the pressure sensor, so that the strength of the injector is preserved. Furthermore, because capnuts are a common feature of many injector designs, the pressure sensor arrangement of the present invention can be applied to existing fuel injector designs without requiring significant redesign. This is advantageous in terms of cost and manufacturing efficiency, and also in that the performance of the fuel injector is not compromised by the requirement to accommodate the pressure-sensing components.

In a preferred embodiment of the invention, the fuel injector further comprises a signal cable external to the injector body to connect with the pressure sensor. In this arrangement, bores or passages need not be provided in the injector body to allow passage of the signal cable.

Advantageously, the capnut is provided with a flattened region over which the signal cable passes. The injector body may carry a outer sleeve, such as a guidance sleeve, and the signal cable may pass between the injector body and the sleeve. Alternatively, the outer sleeve may have a projection, the projection having an opening through which the signal cable passes. These features provides a means for the signal cable to pass between the injector body and a wall of a bore in a cylinder head in which the injector is inserted, in use, while allowing the capnut and/or the sleeve to function in aligning and sealing the injector within the cylinder head bore. Conveniently, the signal cable is adhesively attached to the injector body.

In an elegant arrangement, the signal cable has a first portion parallel to a long axis of the fuel injector, a second portion circumferential to the injector body, and a third portion parallel to the first portion. Such an arrangement can be used to conveniently connect the pressure sensor in the capnut to a terminal connection of the signal cable, when the pressure sensor and the terminal connection lie at different angular orientations around the injector body. To this end, the invention contemplates a method for constructing a fuel injector, the method including the step of selecting such a signal cable having a second portion of appropriate length to permit connection between the pressure sensor and the terminal connection of the signal cable.

The fuel injector of the present invention may comprise a nozzle housing defining a space, wherein the space is in communication with the combustion chamber and the pressure sensor, in use. Furthermore, the fuel injector may also include a sealing washer defining a clearance between the sealing washer and the nozzle housing, wherein the combustion chamber communicates with the space by way of the clearance. These features allow the pressure of the gases in the combustion chamber to act upon the pressure sensor. To this end, the pressure sensor preferably comprises a deformable element which deforms in response to a pressure change in the combustion chamber, in use.

In one arrangement, the pressure sensor further comprises a piezoelectric device which responds electrically to deformation of the deformable element. Alternatively, the pressure sensor may further comprise a piezoresistive device which responds electrically to deformation of the deformable element. For example, the pressure sensor may comprise an electrically functional polymer coating carried on the deformable element, the coating being arranged to respond electrically to deformation of the deformable element. The coating may be piezoelectric or piezoresistive.

The pressure sensor may comprise a strain gauge. A suitable strain gauge may, for example, be resistive, piezoelectric or piezoresistive. Optionally, the deformable element is magnetostrictive to cause a change in the electrical impedance of a coil in response to deformation of the deformable element.

The deformable element may be embodied in a variety of ways. For example, the deformable element may comprise a diaphragm, or the deformable element may comprise a tube coaxial with the capnut.

In a further example, the deformable element comprises a membrane arranged to reflect a quantity of light from a first optical guide into a second optical guide, the quantity of light reflected being governed by the extent of deformation of the membrane. When such a membrane is provided in an optical pressure sensor, the signal cable may conveniently comprise a fibre optic cable.

The signal cable may comprise one or more flat, laminated conductors. A flat signal cable is advantageous in that it can be arranged to lie flat on the surface of the injector. The signal cable can therefore fit between the injector and the wall of the bore in the cylinder head, avoiding the need for additional bores or grooves in the injector or the cylinder head.

To accommodate the pressure sensor, the capnut may include an internal wall having a recess, at least a part of the pressure sensor being accommodated within the recess. Similarly, the capnut may be provided with a bore to accommodate at least a part of the pressure sensor. Alternatively, or in addition, the capnut may include an external wall having a projection, at least a part of the pressure sensor being accommodated within the projection. Furthermore, the fuel injector may comprise two or more pressure sensors accommodated within the capnut.

Certain embodiments of the present invention are particularly advantageous in that, because the pressure sensor is accommodated within the capnut, and the signal cable is routed along the surface of the injector, the injector can be accommodated within a standard injector bore within a cylinder head. The pressure sensor can therefore be provided without the need to depart from existing cylinder head designs, and without the need to provide extra bores in the cylinder head for the pressure sensor or for the signal cable. In addition, sealing of the injector in the cylinder head bore is straightforward.

In alternative embodiments of the present invention, a longitudinal groove is provided in one side of the cylinder head bore to accommodate a projection on the capnut, in which the pressure sensor is housed, and the signal cable. In this case, the modification required to existing cylinder head designs is minimal, and the presence of the projection and the groove advantageously allows the injector to be aligned correctly within the cylinder head during fitting.

It should be noted that, while a capnut forming part of the invention may carry an internal thread to mate with an external thread carried on a portion of the injector, the invention also contemplates a capnut in which internal threads are absent. In the latter case, the capnut may mate with an externally smooth portion of the injector body so that the capnut is an interference fit with a portion of the injector body. Alternatively, such a non-threaded capnut may be held on the injector body by other means, such as with an external clamping means or by a soldered, welded, brazed or adhesive joint. In this specification, unless indicated otherwise by the context, the term 'capnut' should be taken to encompass both threaded and non-threaded variants.

Preferred embodiments of the invention will now be described, by way of example only, with reference to the accompanying drawings in which.

In the remainder of this specification, the terms 'upper' and 'lower' refer to the orientation of the fuel injectors shown in the accompanying drawings. However, it will be appreciated that, in use, a fuel injector could be disposed with any appropriate spatial orientation. The terms 'outer' and 'inner' are used with reference to an origin lying on the long axis of the fuel injector.

Figure 1:
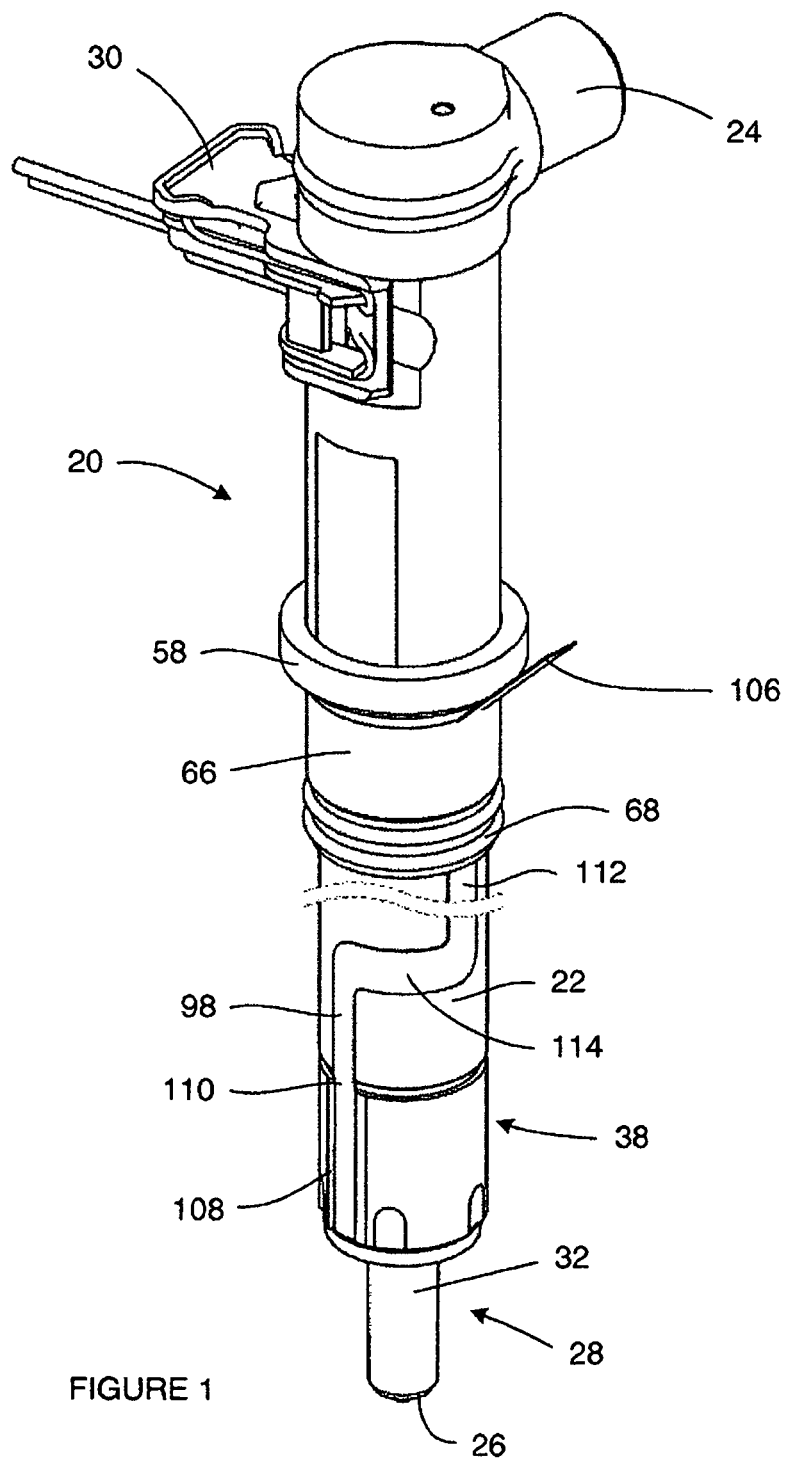
FIG. 1 is a perspective drawing, broken lengthways, of a fuel injector according to a first embodiment of the present invention.
Figure 2:
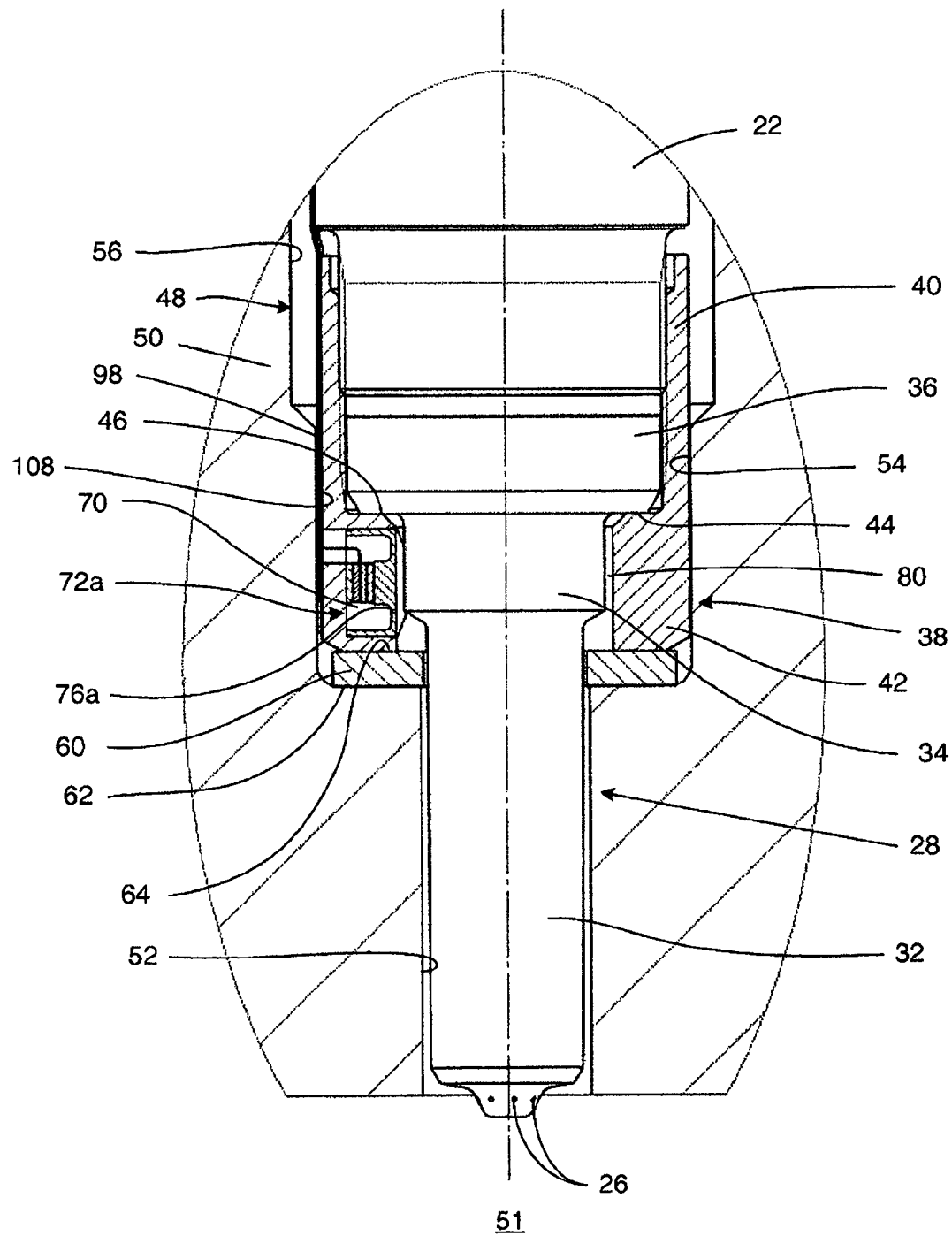
FIG. 2 is a cross-sectional drawing of part of the fuel injector of FIG. 1, when mounted in a bore in a cylinder block.
Figure 3:
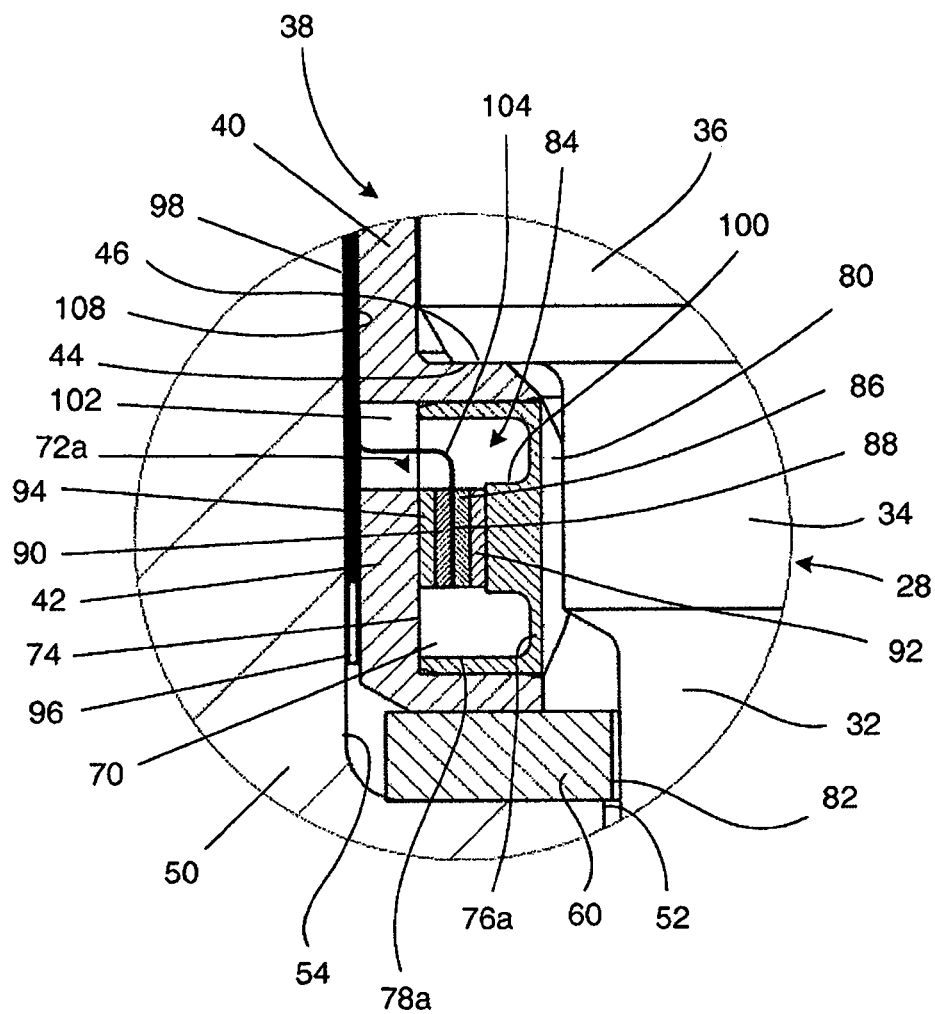
FIG. 3 is a larger-scale cross-sectional drawing of part of the fuel injector of FIGS. 1 and 2, when mounted in a bore in a cylinder block.

Referring to FIGS. 1 to 3, in a first embodiment of the present invention there is provided a fuel injector 20 comprising a generally tubular injector body 22. The injector body 22 houses components arranged to allow control of the passage of fuel from a fuel inlet 24 to outlets 26 provided in a nozzle housing 28 which abuts the lowermost end of the injector body 22. Such an arrangement of components and their operation is described, for example, in the Applicant's European Patent No. EP 0 995 901 B. In this arrangement, in use, a piezoelectric actuator controls the movement of a valve needle housed in the nozzle housing 28. When required, the actuator is energised by an external power source which communicates with the actuator through electrical connections 30 provided at the upper end of the injector body 22, close to the fuel inlet 24.

As can be seen most clearly in FIG. 2, the nozzle housing 28 has a lower portion 32 comprising a tube with a substantially closed end in which the fuel outlets 26 are provided, a collar portion 34 and an upper portion 36. The diameter of the upper portion 36 is slightly smaller than the diameter of the lower end of the injector body 22, and the collar portion 34 and lower portion 32 have successively smaller diameters. The nozzle housing 28 and the injector body 22 are held firmly in contact by a capnut 38, as will now be described.

The capnut 38 is generally tubular and comprises an upper portion 40 and a lower portion 42. The upper portion 40 has an internal diameter similar to the external diameter of the injector body 22, and carries internal screw threads. Complementary external screw threads are provided on the lowermost region of the injector body 22, so that the capnut 38 can be screw-mounted onto the injector body 22. The lower portion 42 of the capnut 38 has an internal diameter slightly larger than the collar portion 34 of the nozzle housing 28. The difference in internal diameter of the upper 40 and lower 42 portions of the capnut 38 provides a shoulder 44 inside the capnut 38. The interface between the upper portion 36 and the collar portion 34 defines a stepped surface 46 of the nozzle housing 28 which abuts the shoulder 44. The upper portion 36 of the nozzle housing 28 is located between the bottom of the injector body 22 and the shoulder 44 of the capnut 38, and the collar portion 34 and the lower portion 32 of the nozzle housing 28 extend through a bore of the lower portion 42 of the capnut 38.

Thus, when the capnut 38 is screwed on to the injector body 22, the shoulder 44 acts against the stepped surface 46 of the nozzle housing 28. In this way, the capnut 38 provides a clamping force to hold the nozzle housing 28 against the end surface of the injector body 22. The magnitude of the clamping force, which is determined by the extent to which the capnut 38 is screwed on to the injector body 22, is sufficient to create a seal between the nozzle housing 28 and the injector body 22. This seal is sufficient to prevent the escape of high-pressure fuel from within the injector body 22 and nozzle housing 28.

In use, the fuel injector 22 is mounted in a bore 48 in a cylinder head 50 of an internal combustion engine. The bore 48 in the cylinder head 50 comprises a first, lowermost section 52 having a diameter slightly larger than the lower portion 32 of the nozzle housing 28, and which receives part of the nozzle housing 28, a second section 54 which has a diameter similar to the external diameter of the capnut 38, and a third, uppermost section 56 having a diameter larger than the external diameter of the injector body 22. In accordance with known methods, the injector 20 is held within the cylinder head bore 48 by means of a clip or other suitable arrangement (not shown) engageable with a mounting ring or flange 58 (identified only in FIG. 1). The lowermost section 52 of the bore 48 opens into a combustion chamber 51 of the cylinder head 50.

The capnut 38 is a tight fit in the second section 54 of the cylinder head bore 48. This ensures that the fuel injector 20 is disposed centrally and axially with respect to the bore 48. A sealing washer 60 is provided between a sealing surface 62 of the bore 48 and an end surface 64 of the capnut 38 to provide a gas-tight seal. This seal prevents combustion gases escaping from the combustion chamber through the cylinder head bore 48.

As can be seen in FIG. 1, an outer guidance sleeve 66 is carried on the injector body 22 close to the uppermost end of the fuel injector 20. The guidance sleeve 66 is tubular, and has an external diameter similar to the diameter of the third section 56 of the cylinder head bore 48. The guidance sleeve 66 is therefore a tight fit in the cylinder head bore 48, and thus serves in combination with the capnut 38 to ensure that the injector 20 is disposed centrally and axially with respect to the bore. The guidance sleeve 66 further comprises an annular seal 68, which pushes radially against the wall of the bore 48 to provide a seal to prevent ingress of water from the engine compartment to the cylinder head bore and to further prevent leakage of gases from the combustion chamber.

As shown most clearly in FIG. 3, a cylindrical recess 70 is provided in the wall of the capnut 38. The cylinder axis of the recess 70 is perpendicular to the long axis of the injector 20 and the recess 70 extends from the inner surface of the capnut towards, but not to, the outer surface of the capnut. A pressure sensor 72a is located within the recess 70, between a back face 74 of the recess 70 and the bore of the capnut 38.

The pressure sensor 72a comprises a deformable element in the form of a plate-like diaphragm 76a supported on a tubular support structure 78a integrated with the diaphragm 76a. The support structure 78a forms the periphery of the sensor 72a, and the external surface of the support structure 78a fits tightly against the internal surface of the recess 70 to form a gas-tight seal. The diaphragm 76a is made from an elastically-deformable metallic material and includes a central land or projection 100.

As shown in FIGS. 2 and 3, when the fuel injector 20 is mounted in the cylinder head 50, a space 80 between the diaphragm 76a and the nozzle housing 28 communicates with the first section 52 of the cylinder head bore 48, and hence with the combustion chamber, by way of a clearance 82 between the sealing washer 60 and the nozzle housing 28.

A piezoelectric device 84 is provided within the pressure sensor 72a. The piezoelectric device 84 comprises a sandwich structure or stack having a first piezoelectric element 86, a central electrode 88, and a second piezoelectric element 90. The piezoelectric elements 86, 90 are made from a material with a high piezoelectric coefficient such as gallium phosphate, quartz or lead zirconate titanate. Each piezoelectric element 86, 90 is disc-shaped, each having a first face adjacent to and in electrical connection with the central electrode 88 and an opposite second face. Each second face carries and is in electrical connection with a respective connection pad 92, 94, the connection pads 92, 94 being disc-shaped and made from an electrically conductive material so as to form two ground electrodes. Both connection pads 92, 94 are electrically connected to a ground conductor 96 of a signal cable 98.

The piezoelectric device 84 and connection pads 92, 94 are carried between the back face 74 of the recess 70 and the projection 100 of the diaphragm 76a. A bore or slot 102 extends from the recess 70 through the wall of the capnut 38 to allow connection of the central electrode 88 to a signal conductor 104 of the signal cable 98.

In use, a change in pressure in the combustion chamber 51 is experienced in the space 80 and thus causes the central projection 100 of the diaphragm 76a to deflect along a radial axis with respect to the capnut 38. For example, if the pressure in the combustion chamber increases, the central projection 100 of the diaphragm 76a responds by moving towards the back face 74 of the recess 70. This deflection compresses the piezoelectric elements 86, 90 and, in turn, causes a change in electrical potential between the central electrode 88 and the connection pads 92, 94. Because the diaphragm 76a is resilient, any subsequent decrease in pressure causes the diaphragm 76a, and hence the central projection 100, to move away from the back face 74 of the recess 70, reducing the compression of the piezoelectric elements 86, 90. The central electrode 88 and the connection pads 92, 94 are connected to an electronic circuit (not shown) comprising a charge amplifier by way of the signal cable 98. The charge amplifier is arranged to apply a substantially constant potential across the central electrode 88 and the connection pads 92, 94 of the pressure sensor 72a. A change in pressure within the combustion chamber 51 is detected by measuring the charge required to keep the applied potential constant. With suitable calibration, the absolute pressure can be determined. The signal cable 98 is connected to an engine control unit (not shown) where the pressure calculation is performed automatically, giving a real-time determination of the pressure in the combustion chamber.

The signal cable 98, comprising the signal conductor 104 and the ground conductor 96, is a laminated cable with a flat cross-section. Each conductor 96, 104 of the signal cable 98 is encapsulated or laminated with a polymeric insulating material to prevent short-circuiting. For example, the conductors 96, 104 may be made from copper foil and encapsulated between polyimide lamination layers.

As shown in FIG. 1, the signal cable 98 passes from the pressure sensor 72a in the capnut 38 to a terminal connection 106. When the injector 20 is mounted in the cylinder head 50, the terminal connection 106 is accessible from outside the cylinder head 50 so that a cable (not shown) from the engine control unit can be connected to the terminal connection 106.

The signal cable 98 is routed along the surface of the fuel injector 20, and is fixed to the injector 20 using a suitable adhesive. No modification of the internal components of the injector 20, which are responsible for fuel delivery, is required because the cable 98 does not pass through the injector body 22 or the nozzle housing 28. As will now be described, special features are provided which allow the signal cable 98 to be accommodated between the outer surfaces of the injector 20 and the bore 48 in the cylinder head 50.

As can be seen most clearly in FIG. 1, the capnut 38 has a rectangular flattened region 108 on its outermost surface in the vicinity of the recess 70. Although the capnut 38 is generally a tight fit in the second section 54 of the cylinder head bore 48, as previously described, the signal cable 98 can be accommodated between the flattened region 108 of the capnut 38 and the second section 54 of the cylinder head bore 48 as shown in FIG. 2.

From the capnut 38, the signal cable 98 extends generally upwards and is accommodated within the clearance between the injector body 22 and the wall of the third section 56 of the cylinder bore 48. The signal cable 98 passes beneath the guidance sleeve 66, and hence contact between the seal 68 of the guidance sleeve 66 and the wall of the third section 56 of the cylinder head bore 48 is unbroken by the signal cable 98. Furthermore, the innermost surface (not shown) of the guidance sleeve 66 is coated with adhesive, such as a heat activated resin or a meltable polymer, so as to ensure that liquids or gases cannot pass the seal where the signal cable 98 passes under the guidance sleeve 66.

In one method of assembling the injector 20 of FIG. 1, the capnut 38 is screwed on to the injector body 22 before the signal cable 98 is attached to the surface of the injector 20. In some cases, the flattened region 108 on the capnut 38 may be angularly misaligned with the desired location of the terminal connection 106, as shown in FIG. 1. For example, with reference to the long axis of the injector 20, the terminal connection 106 may be at a first angle with respect to the fuel inlet 24 while the flattened region 108 on the capnut 38 may be at a second, different angle. To address this, the signal cable 98 comprises a lower portion 110, aligned with the flattened region 108 on the capnut 38, an upper portion 112, aligned with the terminal connection 106 and parallel to the lower portion 110, and a perpendicular or cranked portion 114 lying circumferentially on the injector body 22 to connect the lower and upper portions 110, 112.

Further embodiments of the invention will now be described. In the accompanying drawings, like features of the second and subsequent embodiments share like reference signs with the corresponding features of the first embodiment.

Figure 4:
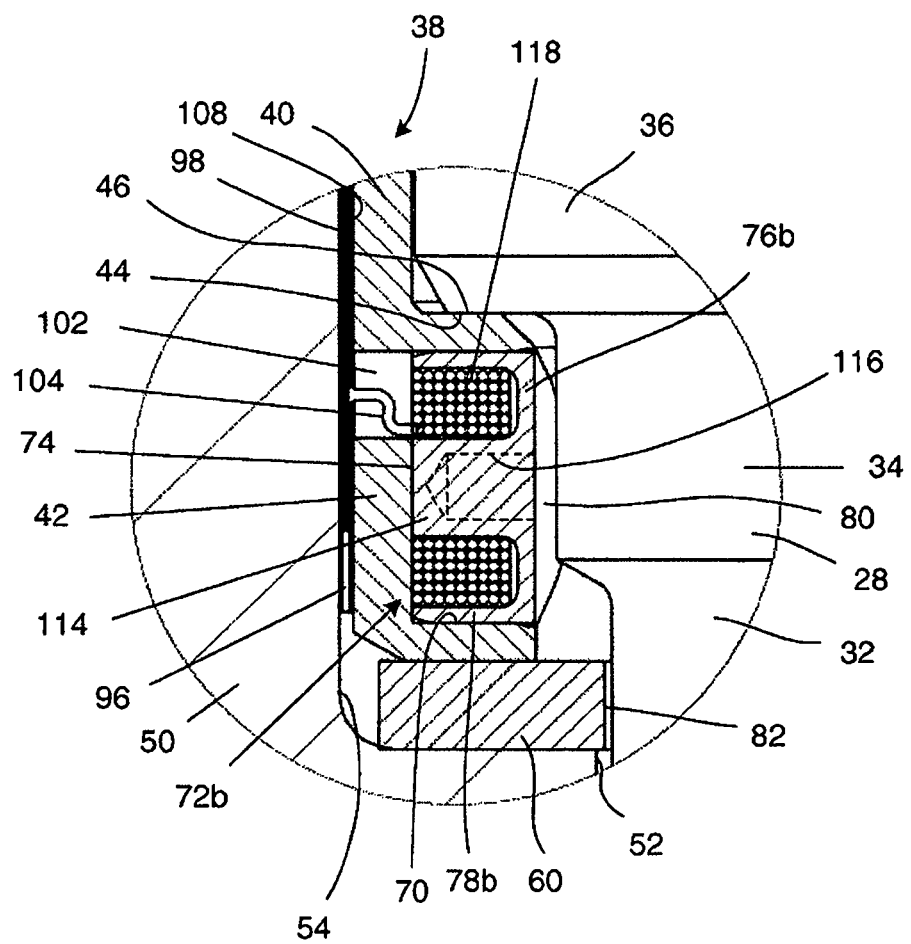
FIG. 4 is a cross-sectional drawing of part of a fuel injector according to a second embodiment of the present invention, when mounted in a bore in a cylinder block.

Referring to FIG. 4, in a second embodiment of the present invention there is provided a fuel injector similar to the fuel injector of the first embodiment, except in that the pressure sensor 72b comprises a diaphragm 76b made from a magnetostrictive material. The diaphragm 76b is supported on an integral tubular support structure 78b, which fits tightly into the recess 70 in the capnut 38. The diaphragm 76b also has a cylindrical land or projection extending from the outermost face of the diaphragm so as to form a central pole 114. The central pole 114 projects towards and abuts against the back face 74 of the recess 70 in the capnut 38, so as to support the central region of the diaphragm 76b. To reduce the stiffness of the diaphragm 76b, a blind bore 116 extends from the innermost face of the diaphragm 76b into the central pole 114. An electric coil or winding 118, which is connected to the signal conductor 104 of the signal cable 98, is wound around the central pole 114 behind the diaphragm 76b.

When the innermost face of the diaphragm 76b is subjected to a change in pressure within the space 80 due to a change in the pressure in the combustion chamber 51, the diaphragm 76b deflects. The resulting strain in the material of the diaphragm 76b causes the magnetic permeability of the diaphragm 76b to change. The change in magnetic permeability causes a corresponding change in the electrical impedance of the coil 118. The coil impedance, monitored externally by way of the signal cable 98, can then be used with appropriate calibration to determine the pressure acting on the diaphragm 76b and hence the combustion chamber pressure.

Figure 5:
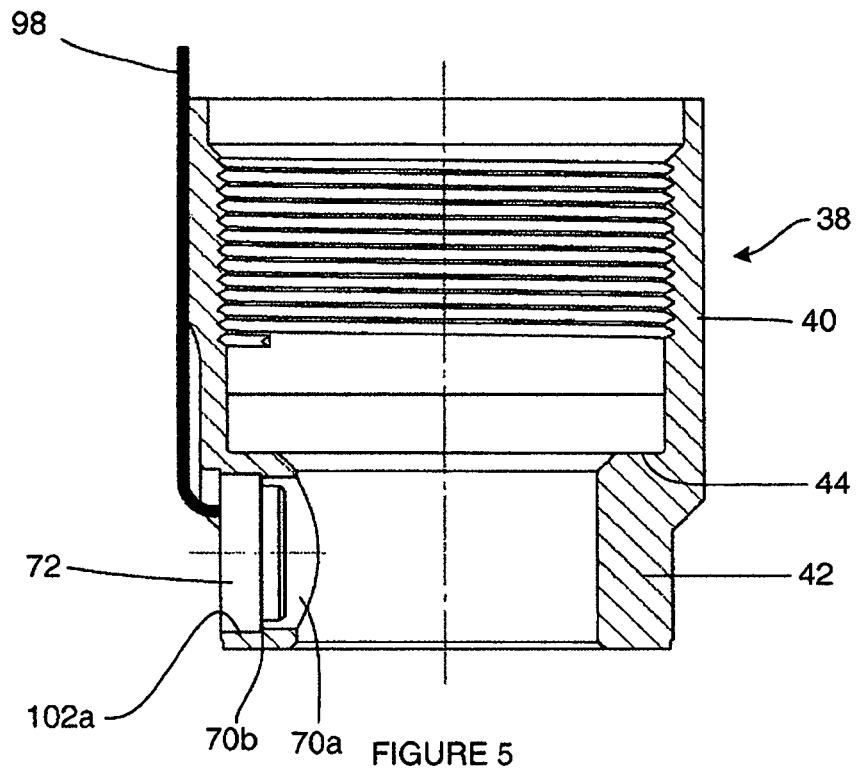
FIG. 5 is a cross-sectional drawing of part of a fuel injector according to a third embodiment of the present invention.

In a third embodiment of the present invention, a fuel injector is provided with a capnut 38 as illustrated in FIG. 5, in which the injector body is not shown for clarity.

In this embodiment, a cylindrical bore 102a is provided within the lower portion 42 of the capnut 38. The bore 102a extends from the outer surface of the capnut 38 along an axis which is perpendicular to the long axis of the injector.

The bore 102a communicates with a cylindrical cut-out or recess 70a formed in the wall of the capnut 38. The bore 102a has a slightly larger diameter than the recess 70a, so as to form a shoulder 70b of the capnut 38 where the bore 102a meets the recess 70a. A pressure sensor 72 is located within the bore 102a. The pressure sensor 72 abuts the shoulder 70b. The pressure sensor 72 may be fixed within the bore 102a by way of welded joints, or may alternatively or in addition be brazed, glued, or form an interference fit within the bore 102a. The pressure sensor 72 and the bore 102a may be provided with complementary screw threads, so that the pressure sensor 72 may be screwed into the bore 102a during manufacture of the injector. The pressure sensor 72 forms a gas-tight seal with the capnut 38. For example, a gas-tight seal may be formed by virtue of an interference fit of the pressure sensor 72 within the bore 102a, by a weld between the pressure sensor 72 and the bore 102a, or by any other suitable means. The pressure sensor 72 may be provided as a stand-alone or sealed unit, and may be of any suitable type. In this way, the pressure sensor 72 may be tested for functionality before fitting to the bore 102a.

As in previous embodiments, a signal cable 98 extends from the pressure sensor 72 along the outer surface of the capnut 38, so as to lie between the capnut 38 and the bore of a cylinder head (not shown), in use.

The pressure sensor 72 partially extends into the recess 70a, so that a sensor element of the pressure sensor 72 experiences any change in pressure in the recess 70a. When the injector is mounted in the cylinder head, the recess 70a is in communication with a combustion chamber of the cylinder head, so that the pressure in the combustion chamber can be determined.

By virtue of the arrangement of the bore 102a and the recess 70a in the capnut 38, the capnut 38 of this third embodiment can be manufactured without difficulty, for example by modification of capnuts manufactured to an existing design.

Figure 6:
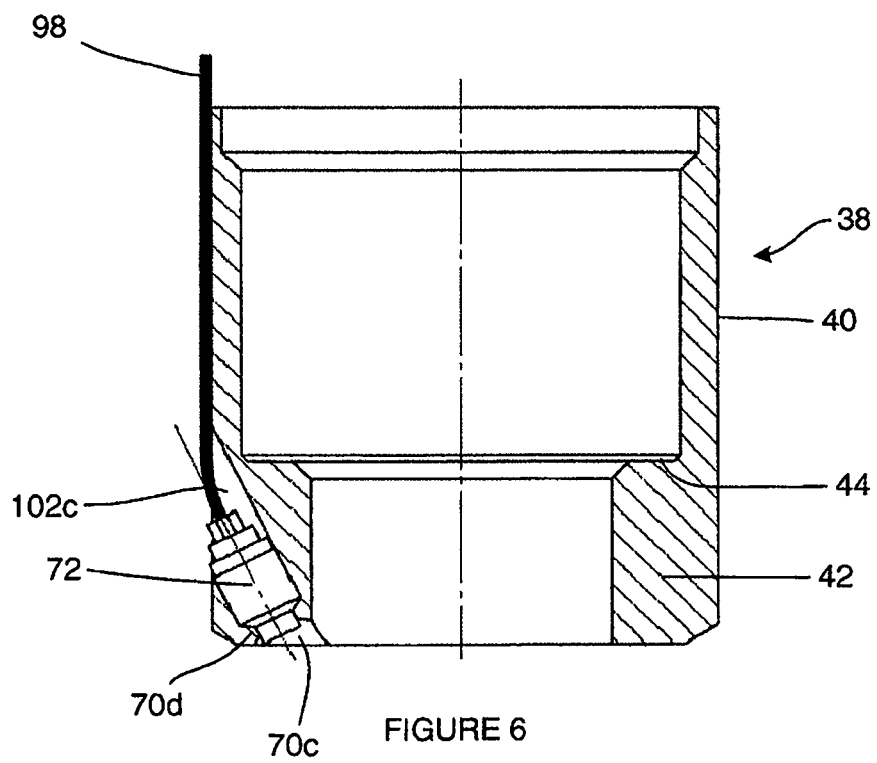
FIG. 6 is a cross-sectional drawing of part of a fuel injector according to a fourth embodiment of the present invention.

In a fourth embodiment of the present invention, a fuel injector is provided with a capnut 38 as illustrated in FIG. 6, in which the injector body is not shown for clarity.

The fourth embodiment of the invention is similar to the third embodiment, except in that the capnut 38 is provided with a bore 102c which extends from the outer surface of the capnut 38 along an axis which lies at an angle to the long axis of the injector. Therefore, unlike the bores 102, 102a of the injectors of FIGS. 2, 3, 4 and 5, the bore 102c does not extend perpendicularly to the long axis of the injector.

The bore 102c communicates with a cut-out or recess 70c formed in the wall of the capnut 38. An annular projection or ridge 70d of the capnut 38 is provided where the bore 102c meets the recess 70c. A pressure sensor 72 is located within the bore 102c so that substantially all of the sensor 72 is received within the bore 102c. The pressure sensor 72 abuts the ridge 70d. The pressure sensor 72 may be fixed within the bore 102c by way of welded joints, or by other means as described with reference to FIG. 5. As in the third embodiment, the pressure sensor 72 forms a gas-tight seal within the capnut 38, for example by means of a weld between the pressure sensor 72 and the ridge 70d, or by virtue of an interference fit between the pressure sensor 72 and the bore 102c.

The pressure sensor 72 partially extends into the recess 70c, so that a sensor element of the pressure sensor 72 is exposed to pressure changes within the recess 70c and hence to the pressure changes within the combustion chamber, in use.

Because the bore 102c extends at an angle to the long axis of the injector, the length of the bore 102c is long enough to accommodate a relatively long pressure sensor 72, such as an optical pressure sensor, within the capnut 38.

Figure 7:
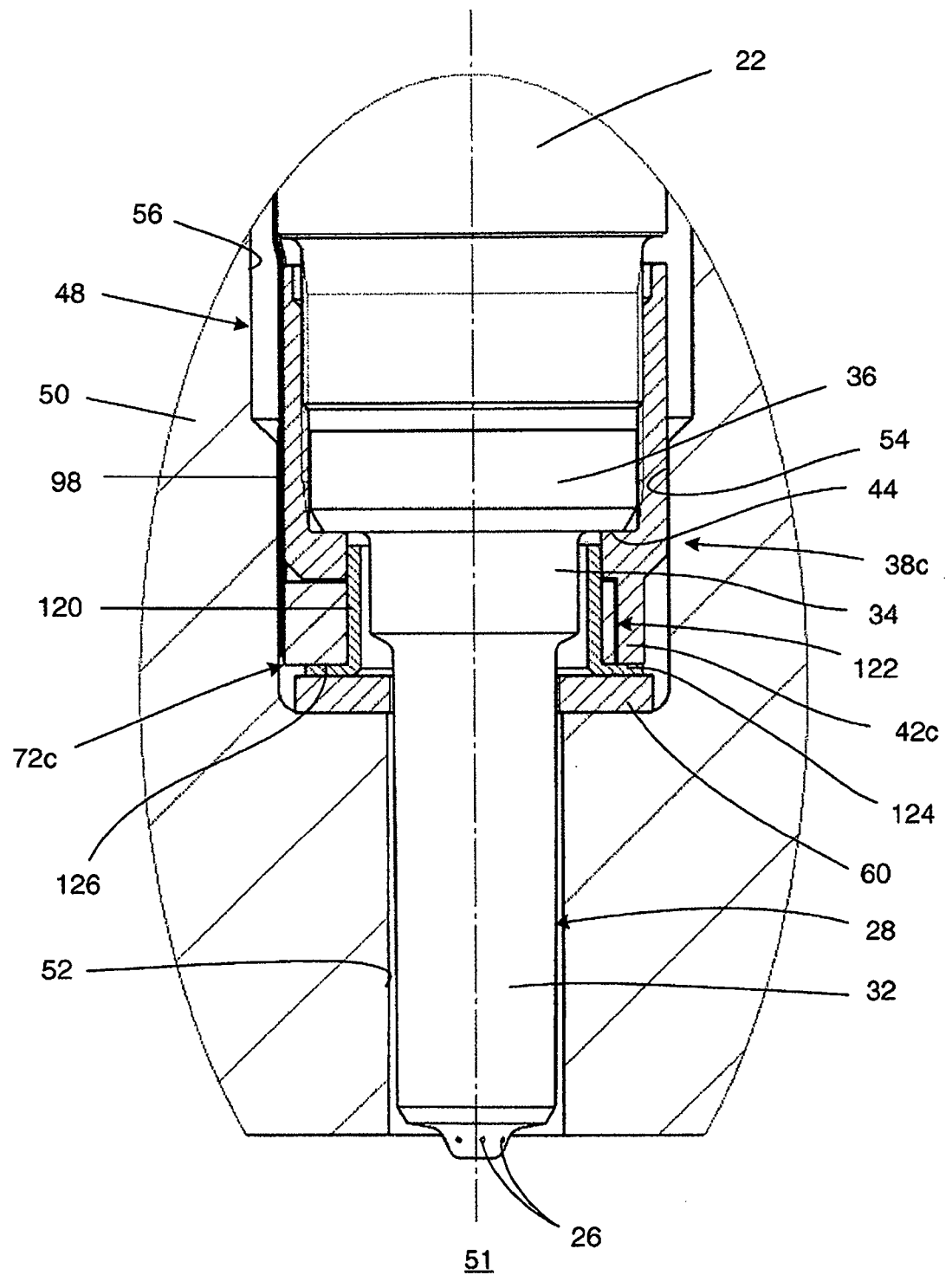
FIG. 7 is a cross-sectional drawing of part of a fuel injector according to a fifth embodiment of the present invention, when mounted in a bore in a cylinder block.
Figure 8:
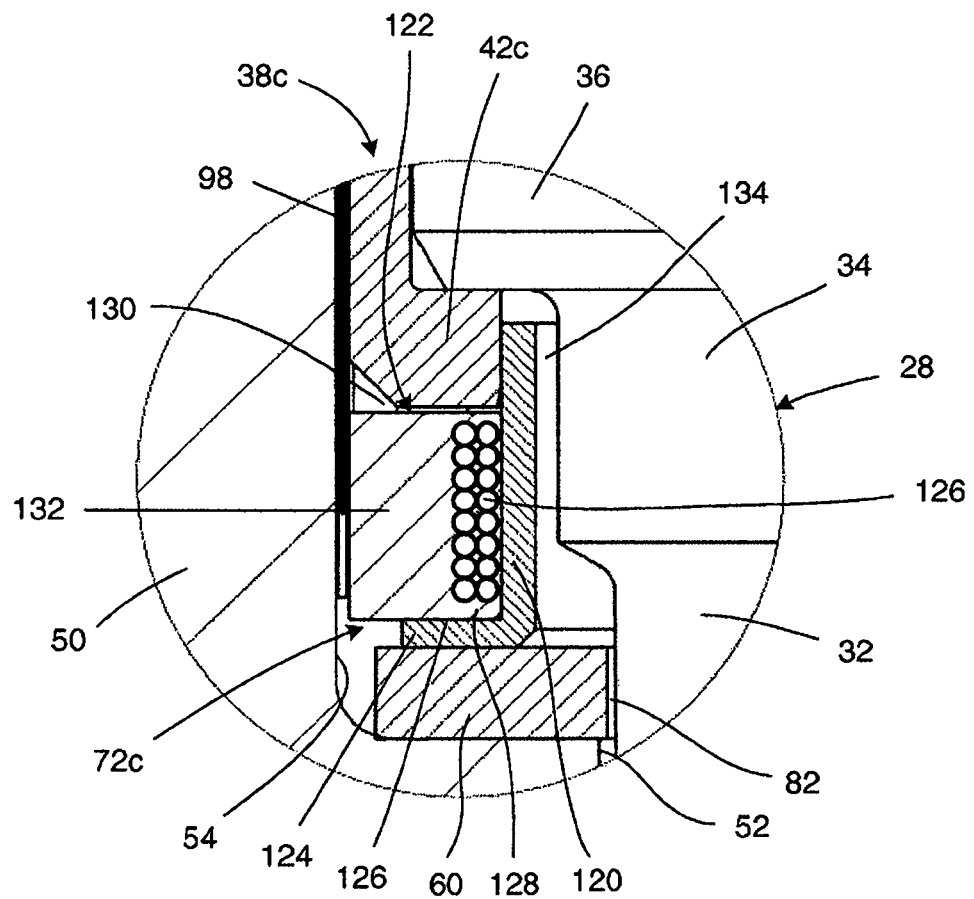
FIG. 8 is a larger-scale cross-sectional drawing of part of the fuel injector of FIG. 7.

In a fifth embodiment of the present invention, illustrated in FIGS. 7 and 8, a fuel injector similar to that of the first to fourth embodiments is provided with an alternative arrangement of the capnut 38c and pressure sensor 72c. The pressure sensor 72c comprises a deformable element in the form of a magnetostrictive tube 120 and a coil or winding assembly 122. The magnetostrictive tube 120 is coaxial with the injector body 22 and the capnut 38c and is accommodated between the lower portion 42c of the capnut 38c and the nozzle housing 28. The lowermost end of the tube 120 is shaped into an outwardly-directed flange 124, and the upper face 126 of this flange abuts the lowermost end of the capnut 38c. When the injector is in position in the cylinder head 50, the flange 124 of the tube 120 is therefore clamped between the capnut 38c and the sealing washer 60. The uppermost end of the tube 120 fits tightly into the capnut 38c to afford a gas-tight seal between the tube 120 and the capnut 38c.

As shown most clearly in FIG. 8, the coil or winding assembly 122, comprising a coil 126 of electrically conductive wire encapsulated in an insulating material 128, is disposed around the tube 120. The coil 126 is in electrical communication with a signal conductor (not shown in FIG. 8) of the signal cable 98. The capnut 38c has an increased diameter in the vicinity of the coil assembly 122 to accommodate the coil assembly 122, and an opening 130 through which a projection 132 of the coil assembly 122 protrudes.

In use, the space 134 between the innermost surface of the tube 120 and the nozzle housing 28 communicates with the first section 52 of the cylinder head bore 48, and hence with the combustion chamber, by way of the clearance 82 between the sealing washer 60 and the nozzle housing 28. When the pressure in the combustion chamber 51 changes, the pressure within the space 134, which acts on the innermost surface of the tube 120, also changes. The tube 120 responds to such a change in pressure by elastically deforming. The resulting strain in the material of the tube 120 causes the magnetic permeability of the tube 120 to change and the change in magnetic permeability causes a corresponding change in the electrical impedance of the coil 126 which can be measured and interpreted in the engine control unit to determine the combustion chamber pressure.

Figure 9:
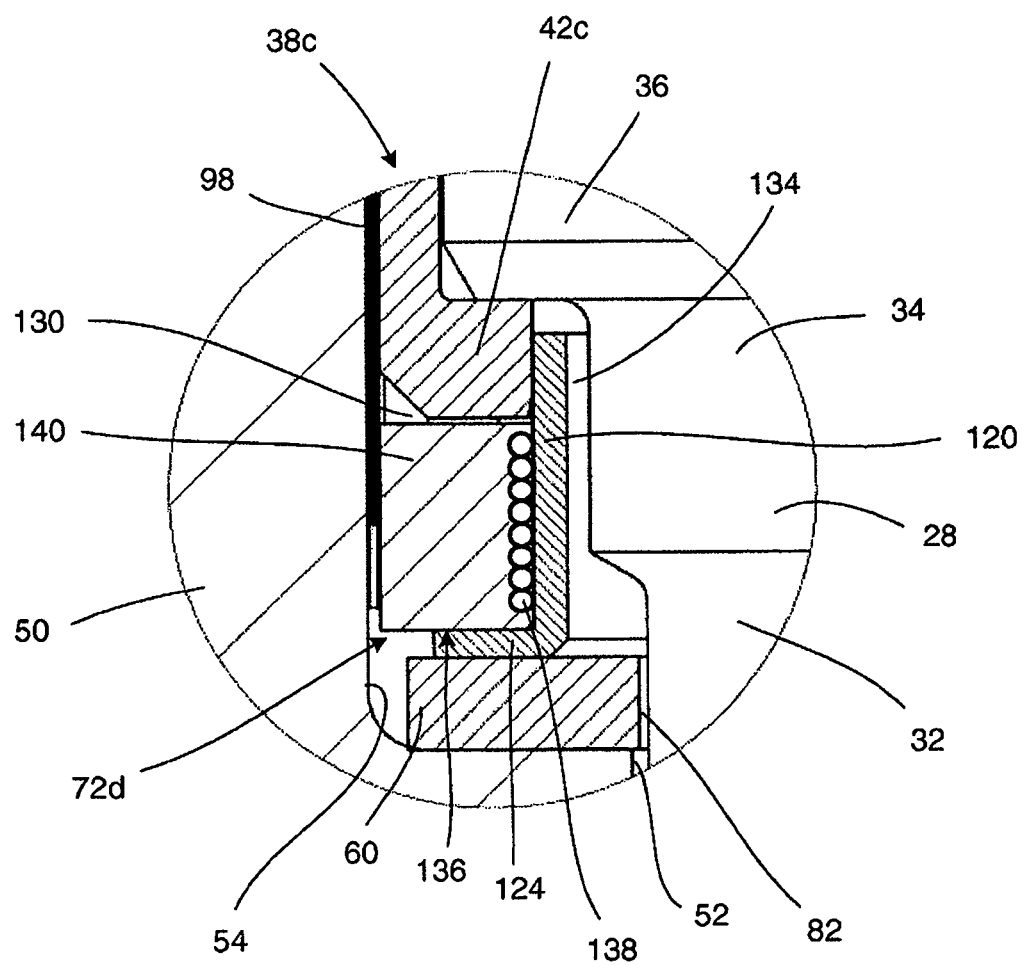
FIG. 9 is a cross-sectional drawing of part of a fuel injector according to a sixth embodiment of the present invention, when mounted in a bore in a cylinder block.

Referring to FIG. 9, in a sixth embodiment of the present invention there is provided a fuel injector similar to that of the fifth embodiment, except in that the coil element is not present. Instead, the pressure sensor 72d has a strain gauge element 136, comprising a strain gauge 138 and an encapsulation 140, disposed around the tube 120. In this embodiment, the tube 120 need not be magnetostrictive, but could instead be formed from another suitable material. As before, the tube 120 elastically deforms in response to changes in the combustion chamber pressure.

The strain gauge 138 includes a coil of wire which, when deformed by the action of the tube 120, undergoes changes in length and cross-sectional area and hence a change in resistance. For example, if the tube 120 is displaced outwards by an increase in pressure within the space 134, the diameter of the wire coil increases. As a consequence, the length of the wire in the coil increases and, correspondingly, the cross-sectional area of the wire decreases. Because the conductive cross-section of the coil is now smaller, and the length of the conductive path is longer, the resistance of the strain gauge 138 increases. Similarly, upon a reduction in the combustion chamber pressure, the resistance of the strain gauge 138 decreases. The wire coil is connected to the signal conductor (not shown in FIG. 9) of the signal cable 98 to allow such changes in resistance to be measured. The resistance changes are interpreted in the engine control unit to determine the combustion chamber pressure.

Alternatively, the strain gauge may be of a conventional type (not shown), comprising a piezoresistive conductor laminated in a polymeric insulating material and connected to a signal conductor of the signal cable. When the tube 120 deflects as a result of a change in the combustion chamber pressure, the length and therefore the resistance of the strain gauge changes. The resistance of the strain gauge can be measured and interpreted to determine the combustion chamber pressure as previously described.

Figure 10:
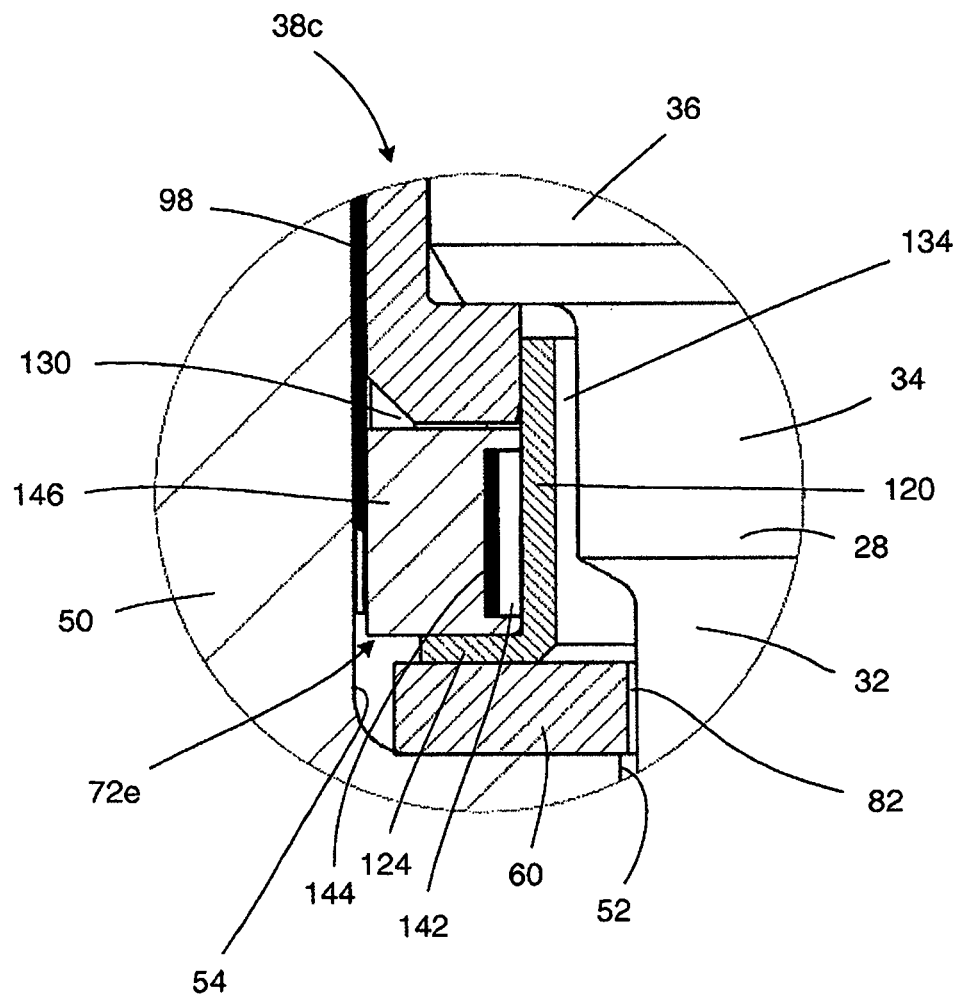
FIG. 10 is a cross-sectional drawing of part of a fuel injector according to a seventh embodiment of the present invention, when mounted in a bore in a cylinder block.

Referring to FIG. 10, in a seventh embodiment of the present invention, a fuel injector is provided which is similar to that of the sixth embodiment, except in that the pressure sensor 72e comprises an electrically functional polymer coating 142 carried on the outer surface of the tube 120 in place of the strain gauge. A conductive electrode 144 is carried on the outer surface of the polymer coating 142 and is connected to a signal conductor (not shown in FIG. 10) of the signal cable 98. An encapsulation 146 covers the electrode 144 and the polymer coating 142. Part of the encapsulation 146 extends into the opening 130 in the capnut 38c.

When a change in combustion chamber pressure causes pressure in the space 134 to change, the tube 120 is caused to deform and the polymer coating 142 changes in length, which causes a change in the electrical response of the polymer. For example, the polymer may be piezoelectric, in which case the change in electrical potential across the coating 142 can be measured to determine the combustion chamber pressure. Alternatively, the polymer could be piezoresistive, in which case the resistance of the coating 142 can be monitored to determine the pressure.

Figure 11:
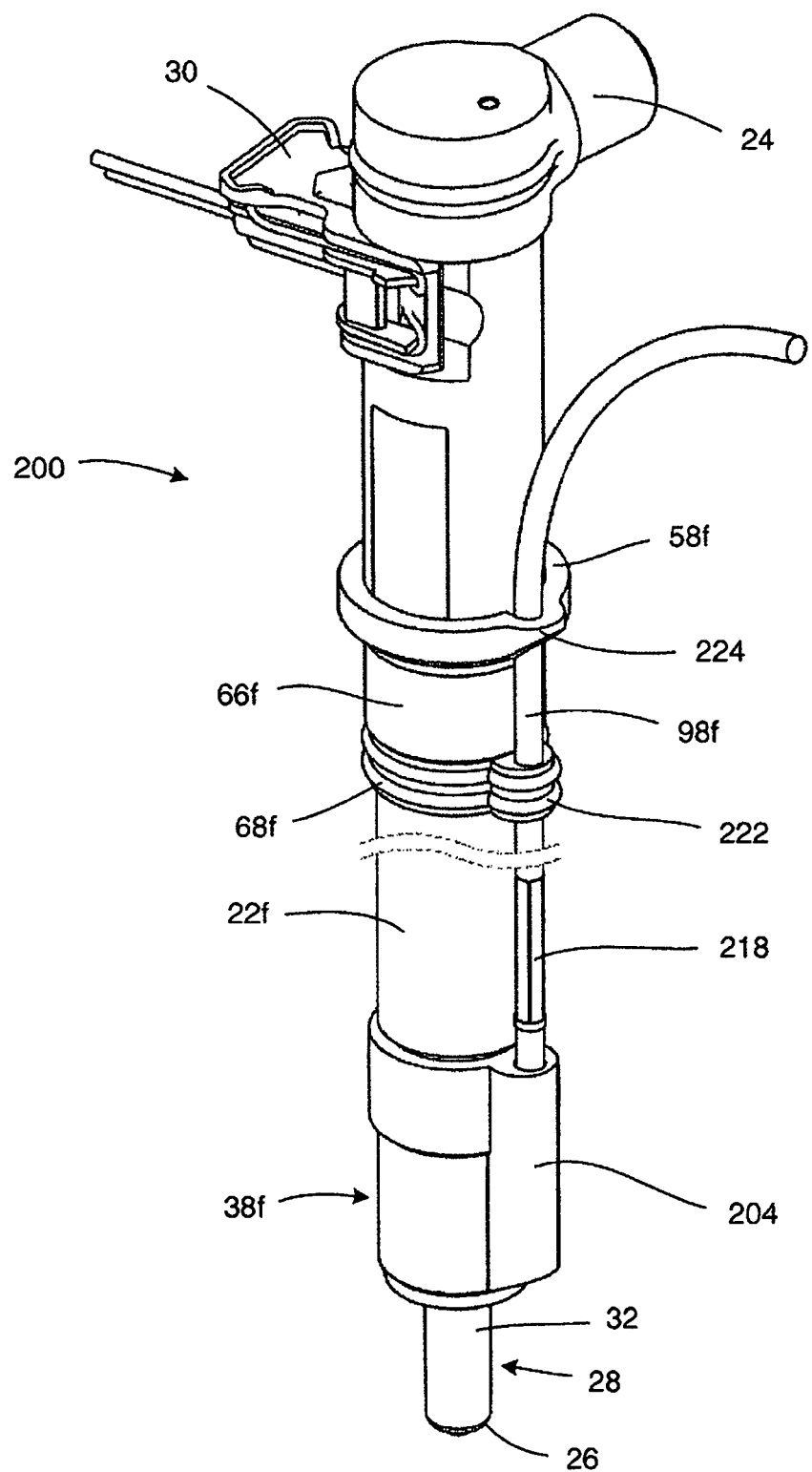
FIG. 11 is a perspective drawing, broken lengthways, of a fuel injector according to a eighth embodiment of the present invention.
Figure 12:
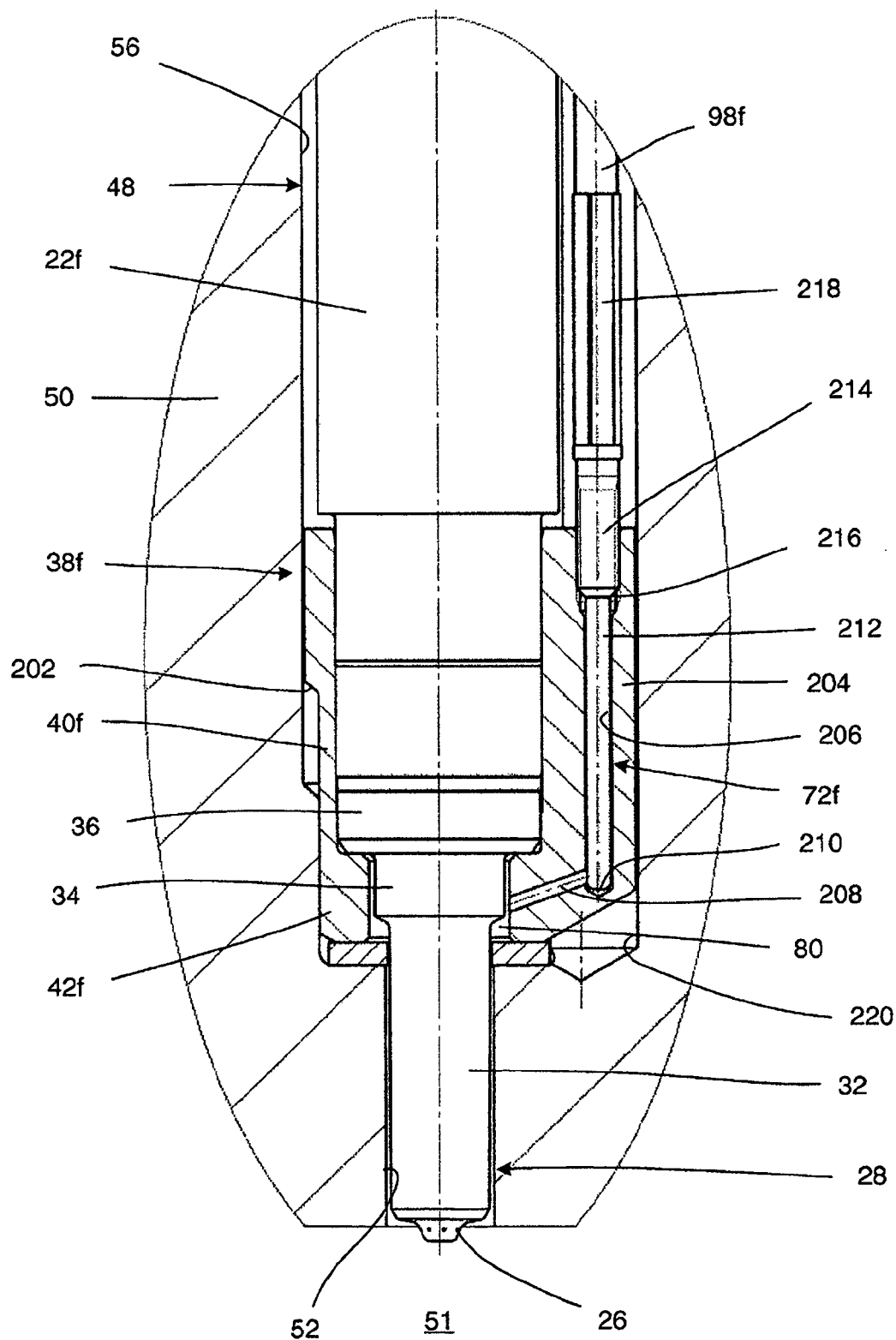
FIG. 12 is a cross-sectional drawing of part of the fuel injector of FIG. 11, when mounted in a bore in a cylinder block.

Referring to FIGS. 11 and 12, according to a eighth embodiment of the present invention, there is provided a fuel injector 200 which differs from the previous embodiments in the arrangement of the capnut 38f, the pressure sensor 72f, the signal cable 98f and the guidance sleeve 66f.

The capnut 38f is generally tubular with an upper portion 40f and a lower portion 42f. The internal diameter of the lower portion 42f of the capnut 38f is slightly larger than the collar portion 34 of the nozzle housing 28, as in the previous embodiments. However, in this embodiment, the internal diameter of the upper portion 40f of the capnut 38f is the same as the external diameter of the lowermost end of the injector body 22f, and no screw threads are provided, so that the capnut 38f is an interference fit or push fit onto the injector body 22f. A step or shoulder 202, formed on the outer wall of the capnut 38f, allows the capnut 38f to be pushed on to the injector body 22f with a suitable tool during manufacture of the injector 200. In this way, the wall of the capnut 38f can be placed under tension, so as to provide a clamping force to clamp the nozzle housing 28 to the injector body 22f.

The capnut 38f has a projection 204 extending outwards from a region of its outside wall and running substantially along the length of the capnut 38f. The projection 204 is part-cylindrical, and the cylinder axis of the projection 204 lies parallel to the long axis of the injector 200.

A blind bore 206 extends along the length of the projection 204, parallel to the long axis of the injector 200. The blind bore 206 communicates with the space 80 between the nozzle housing 28 and the capnut 38f, and hence the combustion chamber 51, by way of a passage 208 through the lower portion 42f of the capnut 38f.

An optical pressure sensor 72f is disposed within the blind bore 206. The sensor 72f comprises first and second optical guides (not shown), a deformable element comprising a membrane 210 at the tip of a probe 212, and an externally threaded collar 214. An upper portion 216 of the blind bore 206 has a complementary internal thread to receive the collar 214. When the sensor 72f is mounted in the blind bore 206, the meshing threads of the collar 214 and the blind bore 206 serve to prevent gas escaping from the blind bore 206 into the cylinder head bore 48.

The operation of such an optical pressure sensor 72f is described in more detail in, for example, European Patent No. EP 1 015 855 B1. In brief, light passes through the first optical guide within the probe 212 and reflects from a surface of the membrane 210 internal to the probe 212. The reflected light passes into and along the second optical guide within the probe 212. The membrane 210 is arranged so that, upon deflection of the membrane 210 due to a change in combustion chamber pressure being experienced in the space 80, the light intensity entering the second optical guide changes. With suitable calibration, the combustion chamber pressure can be determined within the engine control unit from measurements of the reflected light intensity.

The signal cable 98f comprises a fibre optic cable, having first and second optical guides (not shown) to communicate with the respective two optical guides within the probe 212. The signal cable 98f connects the first optical guide of the probe 212 to a light source (not shown) and the second optical guide of the probe to a light intensity detector (not shown). Conveniently, the light source and detector are located in close proximity to one another, for example in an auxiliary electronic unit (not shown). The signal cable 98f is mounted in the collar 214 of the probe 212, and may be integral with the probe 212 and/or the collar 214. Because such a fibre optic signal cable 98f is generally intolerant to kinking or sharp bending, the signal cable 98f extends directly from the capnut 38f towards the guidance sleeve 66f, parallel to the long axis of the injector 200. Flats 218 are provided on the signal cable 98f adjacent to the collar 214 to assist in mounting the probe 212 and the signal cable 98f in the blind bore 206 during assembly.

In order to accommodate the capnut projection 204 and the signal cable 98f within the cylinder head bore 48, a groove 220 is provided down one side of the bore 48, as shown in FIG. 12. As shown in FIG. 11, the seal 68f of the guidance sleeve 66f has a projection 222, which locates within the groove 220 and seals against the wall of the groove 220. The signal cable 98f passes through an opening in the projection 222 of the guidance sleeve seal 68f, the opening forming a liquid and gas-tight seal around the signal cable 98f. The mounting ring 58f also has a corresponding projection 224 to locate within the groove 220, this projection 224 similarly having an opening through which the signal cable 98f passes.

The fibre optic signal cable 98f is therefore located in openings in the projections 204, 222, 224 of the capnut 38f, the guidance sleeve seal 68f and the mounting ring 58f. In combination, these features serve to keep the fibre optic signal cable 98f free from bends and kinks in the vicinity of the injector 200. Furthermore, the projections 204, 222, 224 may be used to provide the correct angular orientation of the injector 200 in the cylinder head 50 by locating in the groove 220, for example to ensure that the fuel inlet 24 can be easily connected to a fuel supply line (not shown).

Many modifications and alternative arrangements lie within the scope of the present invention. In particular, it will be apparent from the foregoing description that many different types of pressure sensor, including types not explicitly described here, could be employed in the present invention.

For example, a pressure sensor could be provided which is similar to that shown FIG. 3 but in which the piezoelectric device has a repeating stack structure with a plurality of signal electrodes alternately stacked with a plurality of piezoelectric elements. Alternatively, piezoresistive elements could be provided in place of piezoelectric elements. In that case, a current would be passed between the signal and ground electrodes, via the signal and ground conductors of the signal cable, in order to determine the resistance of the elements and hence the pressure acting on the diaphragm.

The pressure sensor may be wholly or partly accommodated within a recess in the capnut, or wholly or partly accommodated within a projection. For example, when a deformable element in the form of a tube is provided, the tube may be accommodated in an annular recess in the internal wall of the capnut. Similarly, when an optical pressure sensor is employed, as in the eighth embodiment of the invention, the optical sensor may be located within a recess of the capnut instead of in a projection of the capnut, or within a bore of the capnut as in the third and fourth embodiments of the invention. A pressure sensor may also be accommodated partly in a recess in the capnut and partly in a projection of the capnut.

Although the fuel injector described with reference to FIGS. 11 and 12 has an optical pressure sensor, a similar arrangement having a capnut with a projection to accommodate the pressure sensor could be used for an electrical pressure sensor. For example, such an arrangement could be used if the pressure sensor were too large or unsuitably shaped to be accommodated within the cylindrical external envelope of a tubular capnut, or if the signal cable were too large or inflexible to lie substantially flat on the surface of the injector body.

As a further example, the diaphragm sensor described in U.S. Pat. No. 6,622,558 B2 could be used in place of the pressure sensors described with reference to FIGS. 3 to 6 of the drawings.

When a signal cable is present, the signal cable may conveniently be self-adhesive to allow it to be easily attached to the surface of the injector during assembly of the injector. Alternatively, an adhesive layer could be applied to the injector body or to the signal cable during assembly, or the adhesive may be omitted or only applied to portions of the signal cable. Straps or bands of metal or polymer could be provided around the injector body and the signal cable to keep the signal cable in place. When the signal cable comprises one or more electrical conductors, a ground conductor may not be present, for example if the pressure sensor is in electrical connection with an earth potential of the vehicle by way of the capnut and the cylinder head.

A signal cable comprising one or more electrical conductors, for example a flat, laminated signal cable, may be provided instead of a fibre optic cable when an optical pressure sensor is employed. In this case, means for converting an optical signal provided by the pressure sensor into an electrical signal are provided between the pressure sensor and the signal cable.

If the capnut screws on to the injector body using a conventional screw thread arrangement, the flattened region on the capnut and the terminal connection may be misaligned as previously described with reference to FIG. 1. Because the angular misalignment between the flattened region and the terminal connection may vary between injectors, due to inconsistencies during assembly, the invention contemplates the provision of a range of signal cables, each having a circumferential portion of a different length. In this way, during assembly of the injector, a signal cable with an appropriate shape can be selected, allowing the terminal connection to be positioned in the correct orientation irrespective of the capnut orientation.

The capnut and injector body may instead be provided with complimentary calibrated threads so that, after tightening, the flattened region of the capnut always defines substantially the same angle with respect to the terminal connection. In this case, a single type of signal cable can be used for every injector. If the capnut and injector body are threaded so that the flattened region and the terminal connection lie along the same axis, a straight signal cable, without a circumferential portion, could be used. In a further arrangement, no threads are provided, and instead the capnut is an interference fit on the injector body. During assembly, such a capnut could be set to an appropriate angular orientation before it is pressed on to the injector body, so that the flattened region is aligned with the terminal connection.

More than one pressure sensor may be accommodated within the capnut. The location and arrangement of the or each pressure sensor could differ from the locations and arrangements described above according to the requirements of accuracy of measurement, convenience of manufacture, reliability and so on. For example, in the embodiment of FIG. 9 where the deformation of a tube in response to the combustion chamber pressure is detected, a single strain gauge may be disposed around the whole circumference of the tube, or a plurality of smaller strain gauges may be located at angular intervals around the tube.

Furthermore, pressure sensors of different types could be provided within the same capnut. It may be convenient to provide a first pressure sensor responsive to combustion chamber pressures greater than atmospheric pressure, and a second pressure sensor responsive to combustion chamber pressures less than atmospheric pressure. For example, a first pressure sensor could be provided in a recess or a bore in the capnut wall, and a second pressure sensor could be provided in a projection of the capnut. To this end, the invention contemplates the combination of two or more of the embodiments previously described in a single fuel injector.

If more than one pressure sensor is provided, then a complementary number of signal cables may also be provided. Alternatively, a single signal cable with an appropriate number of conductors, for example electrical or optical conductors, to connect with all of the pressure sensors could be used.

Although the fuel control function of the fuel injector of the present invention has been described with reference to the Applicant's European Patent No. EP 0 995 901 B, it will be apparent that the invention could also be implemented in fuel injectors with alternative arrangements for controlling the flow of fuel. Indeed, because the pressure sensor and its associated components are not located within the injector body, the fuel control function of the injector is unaffected by the integration of the pressure sensor with the fuel injector and, as a result, the present invention could be applied to substantially any fuel injector design having a capnut. For example, the invention could be applied to an injector without a nozzle housing, or where the nozzle housing is integrated with the injector body. To this end, the invention extends to a capnut having an integrated pressure sensor, suitable for fitment to an existing fuel injector, either to replace an existing capnut or to provide a first or additional capnut. The invention also extends to a capnut arranged to accommodate a pressure sensor within the capnut, for example by the provision of bores or recesses to accommodate a pressure sensor.

The invention claimed is:

1. A fuel injector comprising an injector body, a capnut having a wall, and a pressure sensor exposed to pressure changes in a combustion chamber, wherein the pressure sensor is integrated into the wall of the capnut and is outside of the injector body.

2. The fuel injector of claim 1, further comprising a signal cable external to the injector body so as to connect with the pressure sensor.

3. The fuel injector of claim 2, wherein the capnut is provided with a flattened region, and wherein the signal cable passes.

4. The fuel injector of claim 2, wherein the injector body carries an outer sleeve, and the signal cable passes between the injector body and the sleeve.

5. The fuel injector of claim 2, wherein the injector body carries an outer sleeve having a projection, the projection having an opening through which the signal cable passes.

6. The fuel injector of claim 2, wherein the signal cable is adhesively attached to the injector body.

7. The fuel injector of claim 2, wherein the signal cable has a first portion parallel to a long axis of the fuel injector, a second portion circumferential to the injector body, and a third portion parallel to the first portion.

8. The fuel injector to claim 2, wherein the signal cable comprises one or more flat, laminated conductors.

9. The fuel injector of claim 1, wherein the pressure sensor comprises a deformable element that deforms in response to a pressure change in the combustion chamber.

10. The fuel injector of claim 9, wherein the pressure sensor further comprises a piezoelectric device that responds electrically to deformation of the deformable element.

11. The fuel injector of claim 10, wherein the pressure sensor further comprises a piezoresistive device which responds electrically to deformation of the deformable element.

12. The fuel injector of claim 10, wherein the pressure sensor further comprises an electrically functional polymer coating carried on the deformable element, the coating being arranged to respond electrically to deformation of the deformable element.

13. The fuel injector of claim 9, wherein the pressure sensor comprises a strain gauge.

14. The fuel injector of claim 9, wherein the deformable element is magnetostrictive to cause a change in the electrical impedance of a coil in response to deformation of the deformable element.

15. The fuel injector of claim 9, wherein the deformable element comprises a diaphragm.

16. The fuel injector of claim 9, wherein the deformable element comprises a tube coaxial with the capnut.

17. The fuel injector of claim 9, wherein the deformable element comprises a membrane arranged to reflect a quantity of light from a first optical guide into a second optical guide, the quantity of light reflected being governed by the extent of deformation of the membrane.

18. The fuel injector of claim 2, wherein the pressure sensor comprises a deformable element that deforms in response to a pressure change in the combustion chamber, in use, wherein the deformable element comprises a membrane arranged to reflect a quantity of light from a first optical guide into a second optical guide, the quantity of light reflected being governed by the extent of deformation of the membrane, and wherein the signal cable is a fiber optic cable.

19. The fuel injector of claim 1, comprising a nozzle housing defining a space, wherein the space is in communication with the combustion chamber and the pressure sensor.

20. The fuel injector of claim 19, including a sealing washer defining a clearance between the sealing washer and the nozzle housing, wherein the combustion chamber communicates with the space by way of the clearance.

21. The fuel injector of claim 1, wherein the wall of the capnut includes an internal wall having a recess and wherein at least a part of the pressure sensor is accommodated within the recess.

22. The fuel injector of claim 1, wherein the wall of the capnut includes an external wall having a projection and wherein at least a part of the pressure sensor is accommodated within the projection.

23. The fuel injector of claim 1, wherein the capnut carries an internal thread to mate with an external thread carried on a portion of the injector body.

24. The fuel injector of claim 1, wherein the capnut is an interference fit on a portion of the injector body.

25. The fuel injector of claim 1, comprising two or more pressure sensors integrated into the wall of the capnut.

26. A method for constructing a fuel injector, the fuel injector comprising an injector body, a capnut having a wall, and a pressure sensor exposed to pressure changes in a combustion chamber in use, wherein the pressure sensor is integrated into the wall of the capnut and is outside of the injector body, the method including the step of selecting a signal cable according to claim 7, the selected signal cable having a second portion of appropriate length to permit connection between the pressure sensor and a terminal connection of the signal cable.

27. A fuel injector comprising an injector body, a capnut having wall, and a pressure sensor exposed to pressure changes in a combustion chamber in use, wherein the capnut is provided with a bore to integrate the pressure sensor into the wall of the capnut and outside the injector body.

28. The fuel injector of claim 27, wherein the capnut is provided with a recess to expose the pressure sensor to pressure changes in the combustion chamber, in use.

29. The fuel injector as in claim 1, wherein the capnut extends along an axis and includes an inner wall and an outer wall and at least a portion of the pressure sensor is located radially outward relative to the inner wall.

30. The fuel injector as in claim 29, wherein the portion of the pressure sensor is located radially inward relative to the outer wall.

* * * * *